United States Patent
Danilov et al.

(10) Patent No.: US 11,435,923 B2
(45) Date of Patent: Sep. 6, 2022

(54) FORKING DATA STREAMS IN A STREAMING DATA STORAGE PLATFORM

(71) Applicant: EMC IP Holding Company LLC, Hopkinton, MA (US)

(72) Inventors: Mikhail Danilov, Saint Petersburg (RU); Andrei Paduroiu, Bellevue, WA (US)

(73) Assignee: EMC IP HOLDING COMPANY LLC, Hopkinton, MA (US)

(*) Notice: Subject to any disclaimer, the term of this patent is extended or adjusted under 35 U.S.C. 154(b) by 118 days.

(21) Appl. No.: 17/145,581

(22) Filed: Jan. 11, 2021

(65) Prior Publication Data

US 2022/0222001 A1    Jul. 14, 2022

(51) Int. Cl.
*G06F 3/06* (2006.01)
*H04L 67/5682* (2022.01)

(52) U.S. Cl.
CPC .......... *G06F 3/0643* (2013.01); *G06F 3/0604* (2013.01); *G06F 3/067* (2013.01); *H04L 67/5682* (2022.05)

(58) Field of Classification Search
CPC . H04L 67/5682; G06F 3/0643; G06F 3/0604; G06F 3/067
See application file for complete search history.

(56) References Cited

U.S. PATENT DOCUMENTS

| | | | | |
|---|---|---|---|---|
| 9,465,808 | B1* | 10/2016 | Karr ................... | G06F 16/1748 |
| 9,607,000 | B1* | 3/2017 | Madhavapeddi ... | G06F 11/1469 |
| 10,719,256 | B1* | 7/2020 | Zhang .................. | G06F 3/0608 |
| 2005/0022254 | A1* | 1/2005 | Adolph ............. | H04N 21/2353 |
| | | | | 725/135 |
| 2008/0082770 | A1* | 4/2008 | Ahal ................... | G06F 11/2074 |
| | | | | 711/162 |
| 2018/0081561 | A1* | 3/2018 | Todd .................. | G06F 11/1453 |

* cited by examiner

*Primary Examiner* — Jonathan A Bui
(74) *Attorney, Agent, or Firm* — Amin, Turocy & Watson, LLP

(57) ABSTRACT

The technology describes forking (dividing) a data stream into multiple data streams comprising appending a first new data stream and a second new data stream to the original data stream. After forking, the two new data streams have different sets of stream fragments, with one or more of the older stream fragments common to both sets. Data events before the forking operation are read from the original data stream, while data events appended after the forking operation are appended to and read from only one of the data streams, based on which stream each writer/reader is registered to. Also described is truncating the original data stream based on one stream identifier, while leaving the original data intact for another stream identifier. Only when no stream needs a portion of the original data (resulting from separate truncation operations) is the data portion deleted.

20 Claims, 15 Drawing Sheets

FORKING DATA STREAMS IN A STREAMING DATA STORAGE PLATFORM

TECHNICAL FIELD

The subject application relates generally to data storage, and, for example, to a technology that facilitates forking a data stream into two (or more) independent data streams, and related embodiments.

BACKGROUND

Some contemporary data storage systems/platforms, such as DELL EMC's PRAVEGA system/data storage service, store data in a storage abstraction referred to as a data stream, or more simply, a stream. A stream is identified with a name, and can store continuous and potentially unbounded data; more particularly, a stream comprises a durable, elastic, append-only, sequence of stored events. New events are added to a tail (front) of a stream. As can be readily appreciated, PRAVEGA is thus ideal for IoT (Internet of Things) data, where devices/sensors may generate thousands of data points per second. Notwithstanding, PRAVEGA may be highly beneficial for storing data corresponding to more traditional workloads, such as financial trading data that regularly changes.

When a process is working with a data stream, there are times that the process duplicates itself (e.g., via a fork operation) into a new process instance, after which the original process instance and new process instance are not supposed to work with the same data stream with respect to any new data. Simply copying the data stream (which can be extremely large) and having the original process instance continue to work with the original stream, while the new process instance works with the copy of the stream, is impractical. Sealing the original data stream for sharing by the processes (as well as possibly other applications) and creating new data streams leads to problems because management of the shared stream needs to be coordinated between the processes/applications. For example, one application may delete (truncate) the older data it has processed and no longer needs, without considering that another application may still need that older data.

BRIEF DESCRIPTION OF THE DRAWINGS

The technology described herein is illustrated by way of example and not limited in the accompanying figures in which like reference numerals indicate similar elements and in which.

DETAILED DESCRIPTION

Various aspects of the technology described herein are generally directed towards a stream fork operation in a streaming data storage system/platform. As will be understood, the data storage system handles management of shared data and new data in a highly resource-efficient manner, while assuring proper isolation of streams after forking.

In one aspect, when a fork operation is applied to a stream, the streaming data storage system (e.g., via a controller component) creates new actual streams, and logically generates (in stream metadata) an identical copy of the original stream from the perspective of reader applications or the like that need to process the original stream and one of the actual new streams. The system seamlessly stitches together each of the new streams with a logical copy of the original stream from the perspective of a reader application that wants to process data of the original stream. Further, the system manages truncation requests, whereby no application can delete data still needed by another application.

It should be understood that any of the examples herein are non-limiting. For instance, some of the examples are based on PRAVEGA data storage technology; however virtually any stream-based data storage system may benefit from the technology described herein. Thus, any of the embodiments, aspects, concepts, structures, functionalities or examples described herein are non-limiting, and the technology may be used in various ways that provide benefits and advantages in computing and data storage in general.

Reference throughout this specification to "one embodiment," "an embodiment," "one implementation," "an implementation," etc. means that a particular feature, structure, or characteristic described in connection with the embodiment/implementation can be included in at least one embodiment/implementation. Thus, the appearances of such a phrase "in one embodiment," "in an implementation," etc. in various places throughout this specification are not necessarily all referring to the same embodiment/implementation. Furthermore, the particular features, structures, or characteristics may be combined in any suitable manner in one or more embodiments/implementations.

Aspects of the subject disclosure will now be described more fully hereinafter with reference to the accompanying drawings in which example components, graphs and/or operations are shown. In the following description, for purposes of explanation, numerous specific details are set forth in order to provide a thorough understanding of the various embodiments. However, the subject disclosure may be embodied in many different forms and should not be construed as limited to the examples set forth herein.

Figure 1:
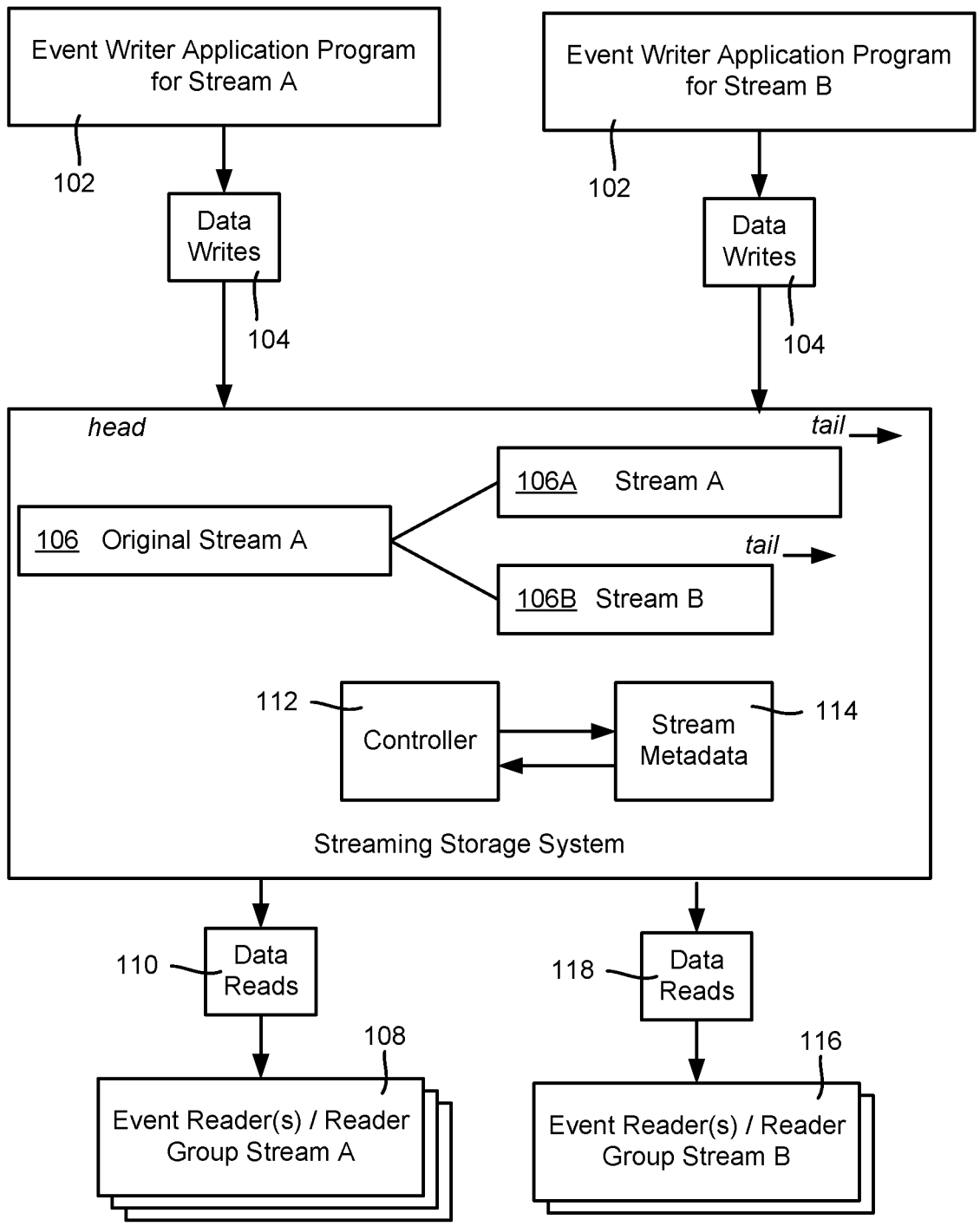
FIG. 1 is a block diagram representation of example components and data-related operations in a streaming data storage system in which a data stream is forked into two data streams, in accordance with various aspects and implementations of the subject disclosure

FIG. 1 shows a streaming data storage system 100 configured for supporting data stream forking as described herein. An event writer application 102 send data writes 104 into the streaming data storage system 100, which are appended to a data stream 106. Note that a stream can be split into segments as described herein, however for purposes of brevity FIG. 1 does not show separate segments.

Applications that read events from a stream, such as the stream 106, are referred to as event readers 108 registered to the stream, or simply readers. Two or more readers can be organized into a reader group, and each event is to be processed by exactly one reader. In this example, a data event in stream A 106 is consumed as data read 110 by an event reader, which can be one of many readers or part of a reader group. The logic implemented by reading applications can be referred to as stream processing.

As described herein, the stream 106 can be divided (forked) into multiple streams 106A and 106B that share the first part of the stream that existed before the fork event. A controller 112 maintains the metadata 114 of the streams as described herein. Event writer application(s) 116 can thereafter register to/write data 118 to the data stream 106B, and other event reader(s)/reader group 120 can register to read data 122 from the stream 106B. In one implementation, the forked data stream 106A continues to be written to by the writer application(s) 102, with data events written after the fork operation consumed/processed by the existing event readers 108. In one implementation, the data writer(s) and reader(s) registered for the data stream 106 need not be aware of the forking of the data stream 106 into the two streams 106A and 106B.

Figure 2:
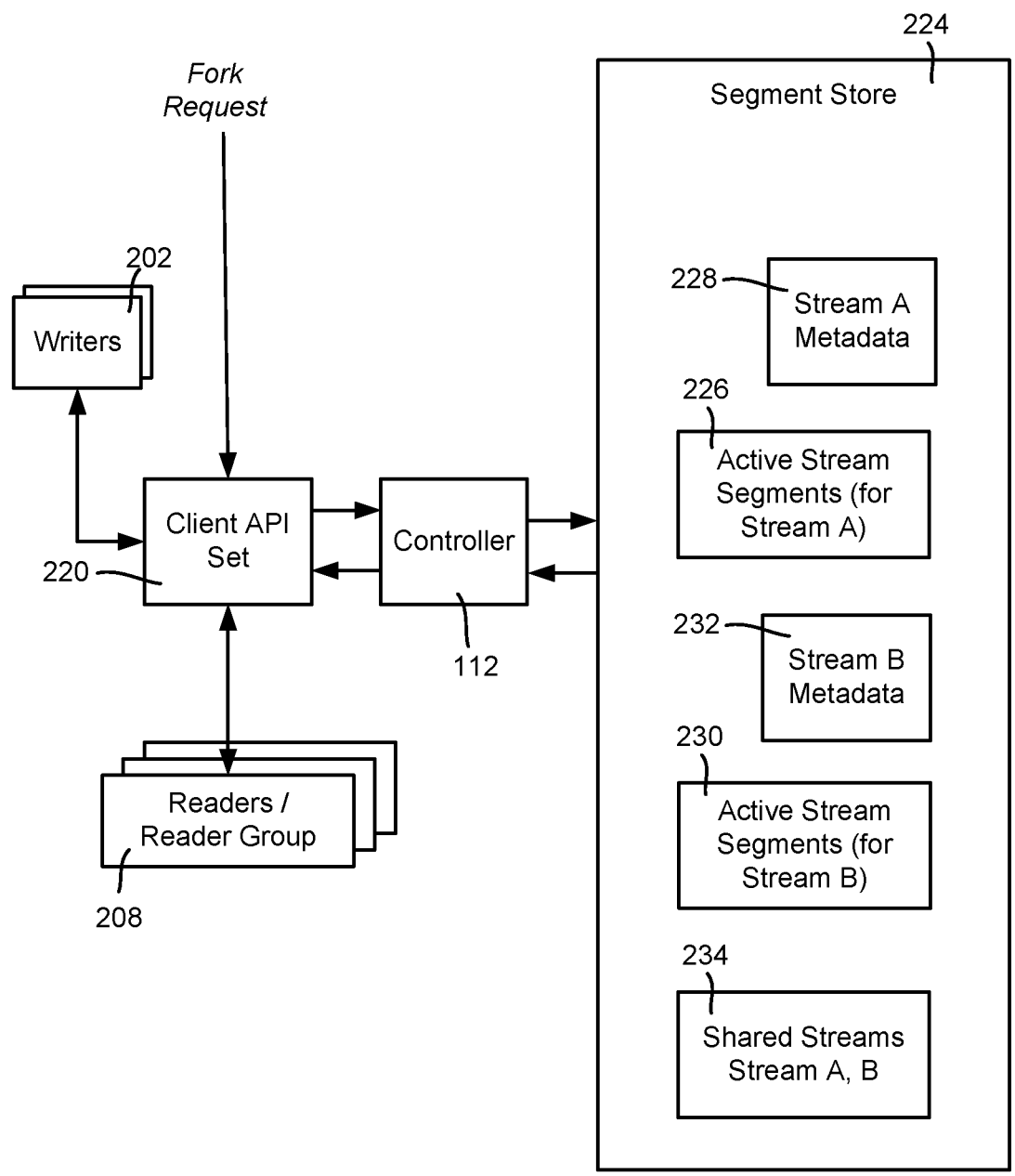
FIG. 2 is a block diagram showing example components and data structures that can be used with respect to forking a data stream, in accordance with various aspects and implementations of the subject disclosure.

As shown in FIG. 2, a streaming data storage system/platform such as PRAVEGA has various components, including a client component 220 that provides a set of APIs to the system (including to readers 208 and writers 202), a controller 112 comprising a system coordinator, and a segment store 224 (component) that manages segments; note that the segment store 224 can be a stream-agnostic component.

One of the APIs of the client component 220 is provided for a fork call (e.g., a request) that divides a stream as described herein. A writer, reader or other (e.g., administration tool) application program can make such a fork call.

Prior to the fork-related operations, the segment store 224 manages active stream segments 226 for stream A (e.g., the stream 106 of FIG. 1), based on metadata 228 associated with the stream A, including any per-segment metadata. After the fork operation, the segment store 224 continues to manage the active stream segments 226 for stream A (e.g., comprising the streams 106 and 106A of FIG. 1), based on the metadata 228 associated with the stream A, and also manages the active stream segments 230 for stream B (e.g., comprising the streams 106 and 106B of FIG. 1), based on other metadata 232 associated with the stream B, including per segment metadata. The controller 112 also tracks the sharing relationship between streams A and B as represented by data structure block 234. Note that while the various metadata (228 and 232) and sharing relationship information (block 234) is shown as being maintained in the segment store 224, the controller can maintain any or all of such information in other data structures external to the segment store 224. There can also be a separate segment store (not explicitly shown) for each stream.

Turning to the concept of stream segments with respect to forking a stream having multiple segments, new events are added to a tail (front) of a stream. Every data event has a routing key, which can be derived from data naturally occurring in the event, e.g. a "machine-id" of the device that generated the event, or based on another source, as long as each routing key is unique with respect to other routing keys for that data stream.

Figure 3:
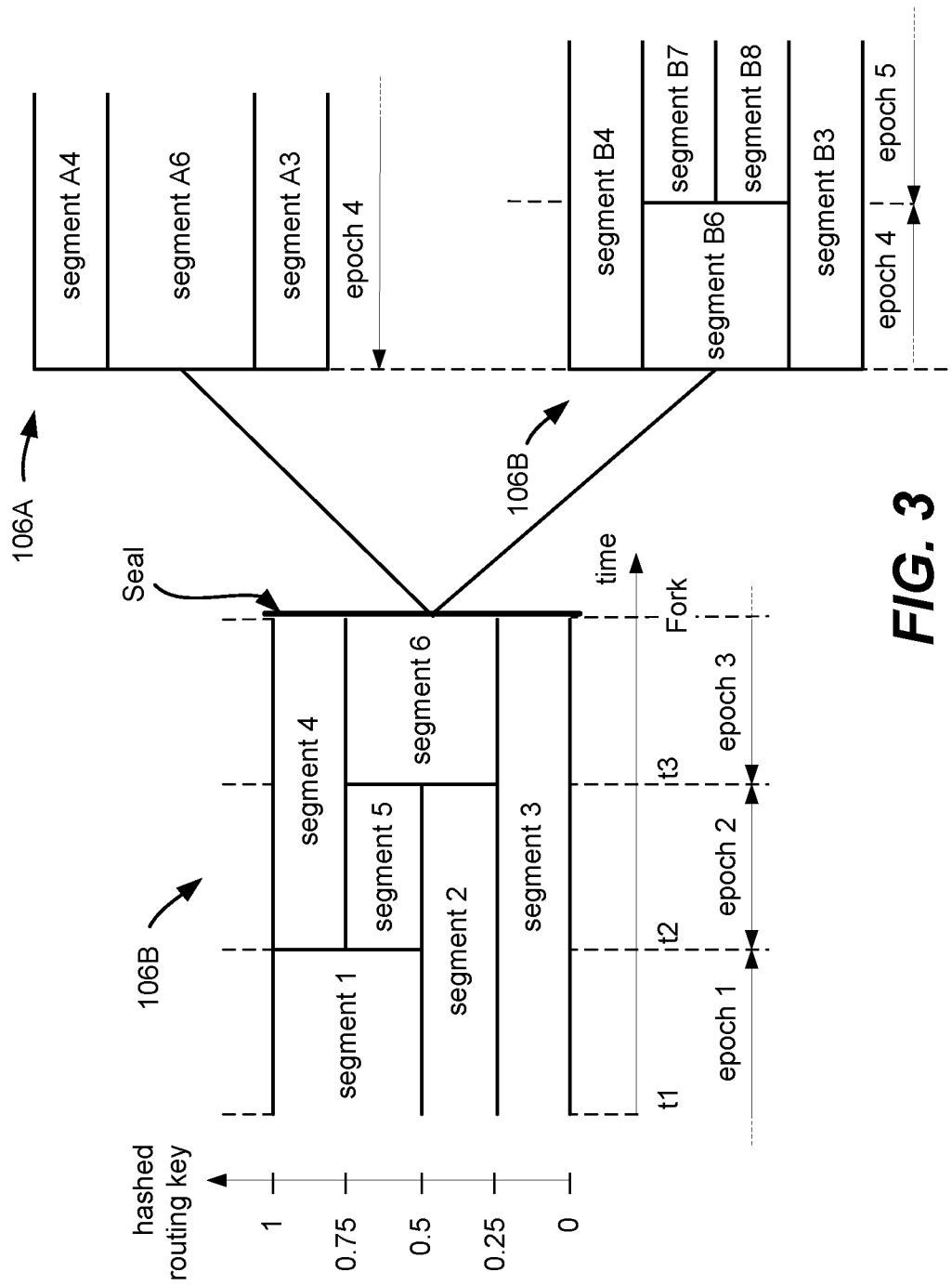
FIG. 3 is an example representation of data stream segments that scale up or down over time epochs, and are forked into separate stream segment parts, in accordance with various aspects and implementations of the subject disclosure.

In one implementation of a stream that is split into segments, the segment to which an event is appended is selected by a consistent hash computation of a routing key associated with that event, such as in the example of FIG. 3. The number of segments can be increased or decreased over time, that is, segments can be automatically scaled up or down based on the current event ingestion load/rate, with a corresponding change to the hash function to map the routing key space to the current number of segments. The number of segments can be on the order of millions; however there is at least one active segment at any time for a writer's events.

The segments thus act as logical containers for events within the stream, with the segment selected for an event to append based on a hash computation of the event's routing key. The number of parallel segments in a stream can automatically increase and decrease over time as shown in the example of FIG. 3.

In FIG. 3, a stream at time t1 has three segments, segments 1, 2, and 3. The rate of data written to the stream is steady until around time t2. At time t2, the system detects an increase in the ingestion rate and splits segment 1 into two smaller segments, segment 4 and segment 5. Segment 1 is sealed and thereby stops accepting events. The hash function that maps routing keys to segments changes accordingly. This process is referred to as scale-up event. Note that segments 2 and 3 continue accepting the same ranges of events.

At time t3, the system detects a decrease in the ingestion rate and merges segments 2 and 5 into one segment 6. Segments 2 and 5 are sealed and stop accepting events. The hash function that maps routing keys to segments changes accordingly. This process is referred to as scale-down event. Note that segments 4 and 3 continue accepting the same ranges of events.

A time interval between two successive scaling events can be referred to as an epoch. In the example, there are three epochs (before the time of forking). The first epoch starts sometime in the past and ends at time t2, the second epoch starts at time t2 and ends at time t3, the third epoch starts at time t3 and ends sometime in the future, which in this example is a result of the forking event.

Note that in general PRAVEGA keeps a reasonable amount of fresh data only in Tier-1 storage. Older segment data is aggregated into data chunks and written to an object storage system (e.g., Dell EMC ECS) or to a file storage system (e.g., Dell EMC Isilon) in Tier-2 storage, where a chunk is an ordered list of events from one segment. In this case, PRAVEGA works as Tier-1 storage of a multi-tiered system, and the file/object storage system works as Tier-2 storage, with PRAVEGA implementing "auto-tiering" for stream data.

While a stream is potentially unbounded, storage resources are normally limited (even Tier-2). PRAVEGA provides a mechanism (e.g., an automatic time-based data expiration feature) to cut streams short, by deleting events from a head (back) of a stream, which is the leftmost part in the figures. When a stream needs to be cut short, the system cuts the stream based on a so-called stream-cut object (or simply stream-cut), comprising a position in the stream at an event boundary. For a multi-segment stream, a stream-cut is a composite position that goes through all segments of the stream. The events that are ahead of the stream-cut (that is, older events) to be used for truncation/deletion are removed from the stream. Note that in addition to automatic data expiration, an application can truncate a stream using an explicit API call.

As described herein, consider an application such as a UNIX process that logs state/events to an associated stream. The process can duplicate itself using a fork call (not to the client as described herein, but to UNIX, which takes care of the processes' memory producing two identical copies of address space. The two processes are not to share the stream for new data; described herein is providing a fork API call to the streaming data storage system, which thereafter provides forked streams.

Figure 4:
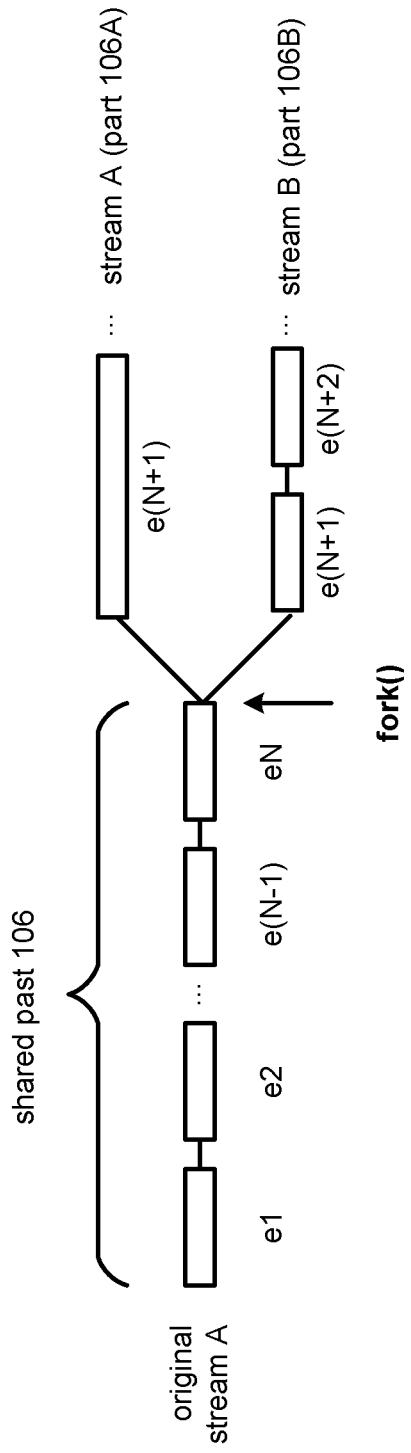
FIG. 4 depicts various example aspects of stream fork operations, in accordance with various aspects and implementations of the subject disclosure.

As shown in FIG. 4, when the fork operation is applied to a stream A such as the stream 106 of FIG. 1, the stream A 106 is split into two initially identical streams, one stream comprising stream A (stream part 106) plus a new stream A part 106A, and another stream B comprising stream A's shared past part 106 plus stream B's own new part 106B. The two streams share the data created within the original stream at the moment the stream was forked. The two streams also share stream-level settings, e.g., auto-scaling and expiration policies. The settings can be changed, per stream, later on.

Stream A also inherits everything else, e.g., the original stream's name, the registered applications (readers/writers) of the original stream, and so on. Stream B is created with a new name, which can be provided by the application as a parameter of the fork API call, or can be automatically generated from the name of the original stream (for example, CopyA). New applications are to be registered against stream B on demand thereafter, e.g., shortly after the forking.

To implement forking at the data level as described herein, in response to a fork call, the stream (shown in its Nth epoch) is closed by the controller 112 (FIG. 1), that is, the controller 112 closes the Nth epoch. More particularly, this means that original stream A (stream 106) has its open segments sealed, as represented in FIG. 3. As streams (and stream segments) are append-only constructs, there is no need for any data copying. The two streams A 106A and B 106B, share the past of the original stream 106, comprising epoch N and the preceding epochs to the head of the stream (e.g., epoch e1).

As shown in FIG. 4, when creating the new stream parts 106A and 106B, the controller 112 creates two identical but separate epochs N+1 for the two streams. As shown in FIG. 3, each of the new epochs duplicates the structure of epoch N (e.g., segments 4, 6 and 3). From this point forward the two streams 106A and 106B are populated with new events independently and scale up/down independently; e.g., FIG. 3 shows segment B6 of the data stream 106B being split into segments B7 and B8, corresponding to a new epoch for the data stream 106B. Similarly, FIG. 4 shows stream A 106A still being in epoch e(N+1), with stream B 106B having two epochs e(N+1) and its current epoch e(N+2).

Note that FIGS. 3 and 4 can be interpreted as representing synchronous forking, in which active writers are blocked during the time period between the Nth epoch closure and the creation of epoch N+1. Some applications, e.g., loaded applications, may prefer asynchronous forking, which is less deterministic but assures a smoother transition for active writers.

With asynchronous forking, the system (e.g., the controller 112) creates epoch N+1 first, and only after creation of epoch N+1 closes epoch N. More particularly, with asynchronous forking, the controller creates epoch N+1 on the original stream, which creates the successor segments (a one-to-one rollover). The controller copies metadata up to epoch N to the new stream, and creates epoch N+1 on the new stream, which makes the new stream ready to accept independent appends.

When the epoch N segments are sealed, any active writers (virtually) immediately detect the change, (as attempting to append to a sealed segment returns an error), and switch over appending to the new segments seamlessly. When implemented this way, active writers can continue writes during the preparations for forking, and move past the forking point virtually instantly. This is less deterministic because stream B can share events written after the fork call, yet during the N epoch, just before it is closed/sealed.

Figure 5:
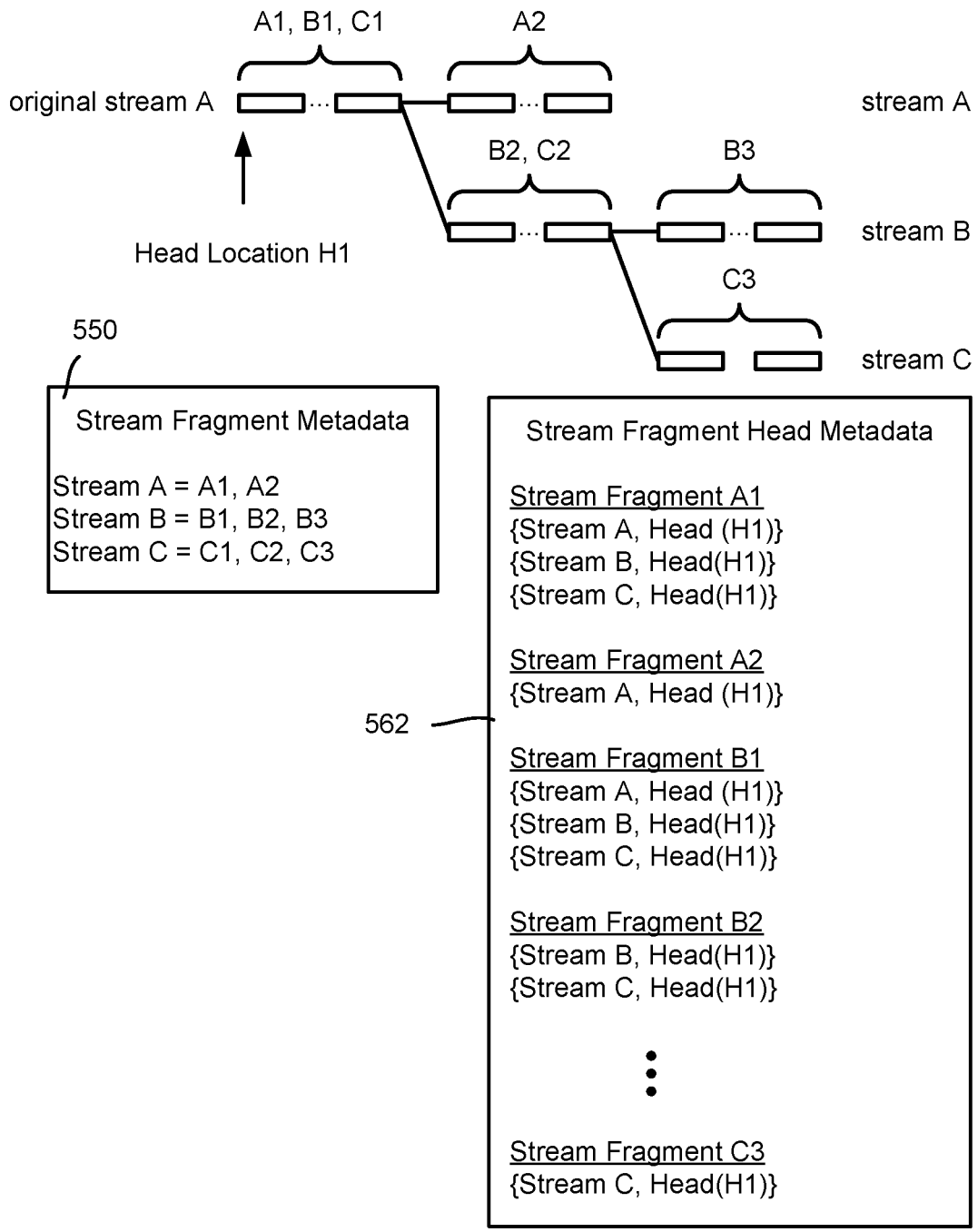
FIG. 5 depicts various example aspects of stream fork operations, including stream fragments and metadata structures, in accordance with various aspects and implementations of the subject disclosure.

Turning to FIG. 5, with respect to forking, the structure of a stream can be described with a new abstraction, referred to as stream fragments. In this abstraction, a stream is sequence of one or more stream fragments, some of which can be shared. For example, stream A in FIG. 5 is comprised of stream fragments A1 (before epoch closing) and A2 (after epoch closing). Stream B is comprised of stream fragments B1 (=A1), B2, and B3. Stream C, forked from stream B which created stream fragment B3, is comprised of stream fragments C1 (=A1=B1), C2 (=B2), and C3. These are represented as the stream fragment metadata in block 550.

As the two streams, streams A and B, share legacy stream data, they also can share some of the system metadata that describes the legacy data. However, some metadata needs to be separately maintained per stream. For example, consider that stream A has some data to be deleted/truncated while stream B is still using that data. Thus, the data to be deleted/truncated with respect to stream A needs to remain available for stream B.

To this end, the controller 112 keeps track of streams that share data, (as shown in FIG. 2 via block 234). Upon each stream truncation request (from the data storage point of view, stream deletion can be seen as stream truncation up to its tail), the controller 112 finds the earliest (e.g., leftmost in the figures) head among the streams that share stream data. Only the data (epochs, segments, chunks in Tier-2) prior to the earliest/leftmost head can be physically deleted, e.g., using the existing PRAVEGA deletion logic. If there is not such older data, the stream head is moved forward with respect to a reader corresponding to the truncation request, but the older data is left as is with respect to a reader with an earlier head location.

Figure 6:
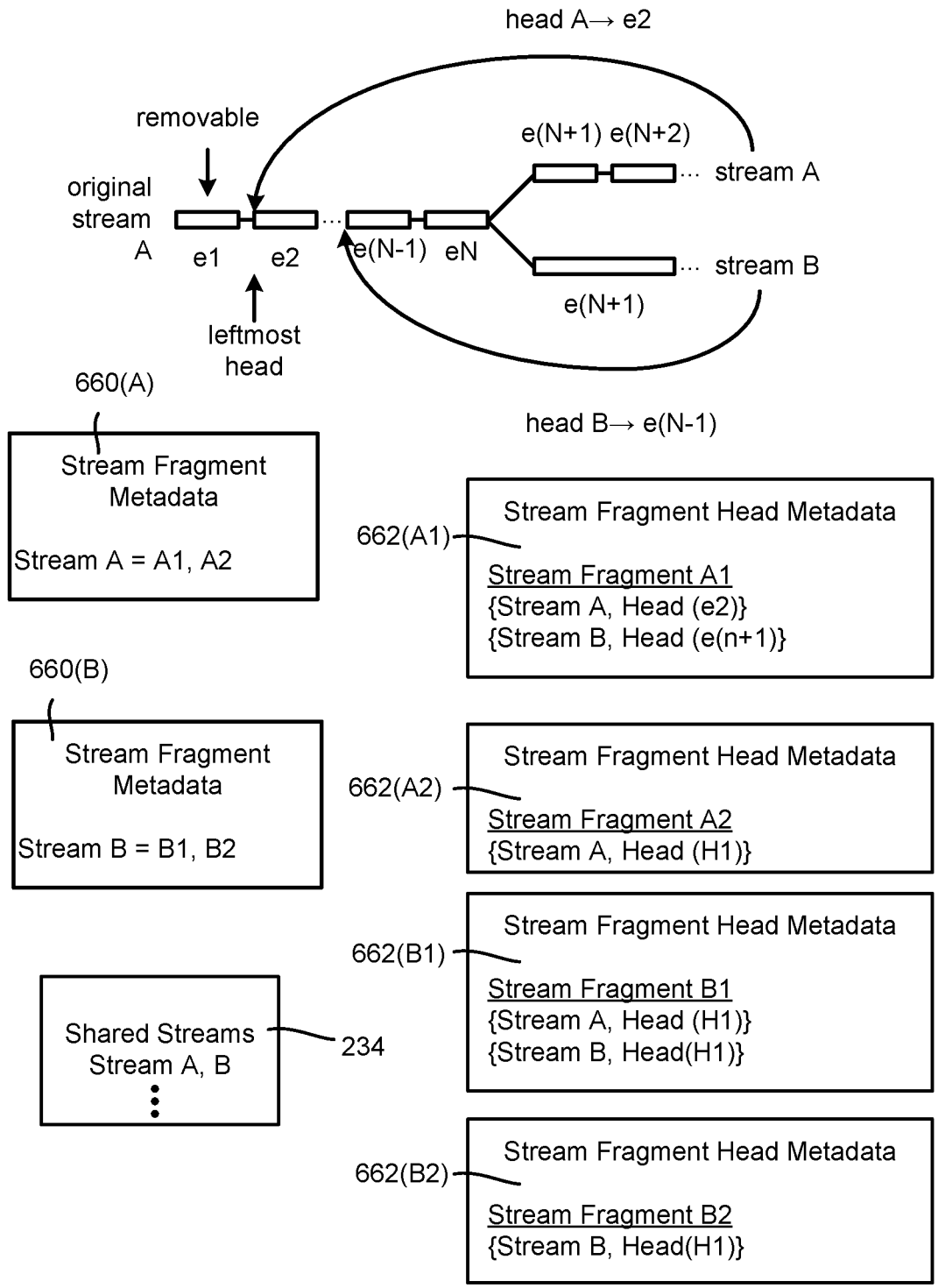
FIG. 6 depicts various example aspects of stream truncation, including detection of no long needed removable stream data, in accordance with various aspects and implementations of the subject disclosure.

By way of example, FIG. 6 depicts the logic of detection of removable stream data, generally continuing from the example of FIG. 5 (before new stream C is created via forking). After some time, stream A and B have been separately truncated, such that the head of stream A is at (points to) the beginning of epoch 2, whereas the head of stream B is at (points to) the beginning of epoch N−1. The head of stream A is earliest/leftmost. Therefore, the older stream data portion prior to (to the left of) stream A's head is removable. The controller 112 commands the segment store 224 to delete the segment data corresponding to this older portion; (note that by this time, this data portion is typically stored in Tier-2 storage in the form of chunks). After that the controller deletes epoch 1 itself.

If instead the truncation request was, for example associated with stream B, the location of the head for stream B is moved forward, e.g., the head location pointer in stream B can be moved from epoch N−1 to point to epoch eN. Thereafter, a reader of stream B can only read events from as far back as epoch eN; (note that in one or more implementations, truncation need not be aligned with an epoch). No data is removed at this time because stream A is still associated with an earlier (the leftmost) head e2, which is before eN.

It should be noted that while streams A and B may share past events, at some point one or both of the streams can be truncated to have a head that is beyond the forking point. Once this occurs, for example, the streams become completely independent relative to one another at the moment one of the streams' heads crosses the border between the forking point, which in the example of FIG. 5 is between epoch N and epoch N+1.

In the implementations described herein, the above technology does not require any changes to the segment store or to the functioning of the client (other than the client providing a new API to fork the stream). The forking-related operations are performed by the controller 112, and particularly with respect to how the controller 112 manages the various stream metadata. Note that a stream is typically an ordered, bi-dimensional (because of routing keys) collection of segments, which can have predecessors and successors, and this does not change as a result of forking technology.

In one example implementation, the stream metadata format comprises one or more stream fragments, in which each stream fragment is a contiguous section of a stream that is bounded, at both ends, by either the beginning of the stream or a stream fork. As a result, the stream fragment metadata (e.g., blocks 660 and 662 in FIG. 6) that corresponds to a stream fragment contains a non-zero, whole number of epochs and a non-zero, whole number of one or more segments (that is, no epoch or segment may cross a stream fragment boundary). The stream (fragment) metadata can therefore be expressed as a unidimensional sequence of stream fragments, where each stream fragment is a bi-dimensional collection of segments; (a stream without any forking activity is therefore made of a single stream fragment).

A stream fragment has some additional stream head metadata, which can be in the form of key-value pairs for each stream in which the stream fragment is referenced, e.g., as a stream head collection per fragment. The stream head metadata comprises, as the key, the name/identifier (ID) of the stream, and the associated value as the head of the stream (its offset location pointer) referenced by the key. An example of stream fragment head metadata is shown as maintained in a single data structure 562 in FIG. 5 or alternatively in individual data structures per stream fragment, as shown in the data structures 662(A1)-662(B2). As is understood, there are many possible implementations for keeping these metadata.

Figure 7:
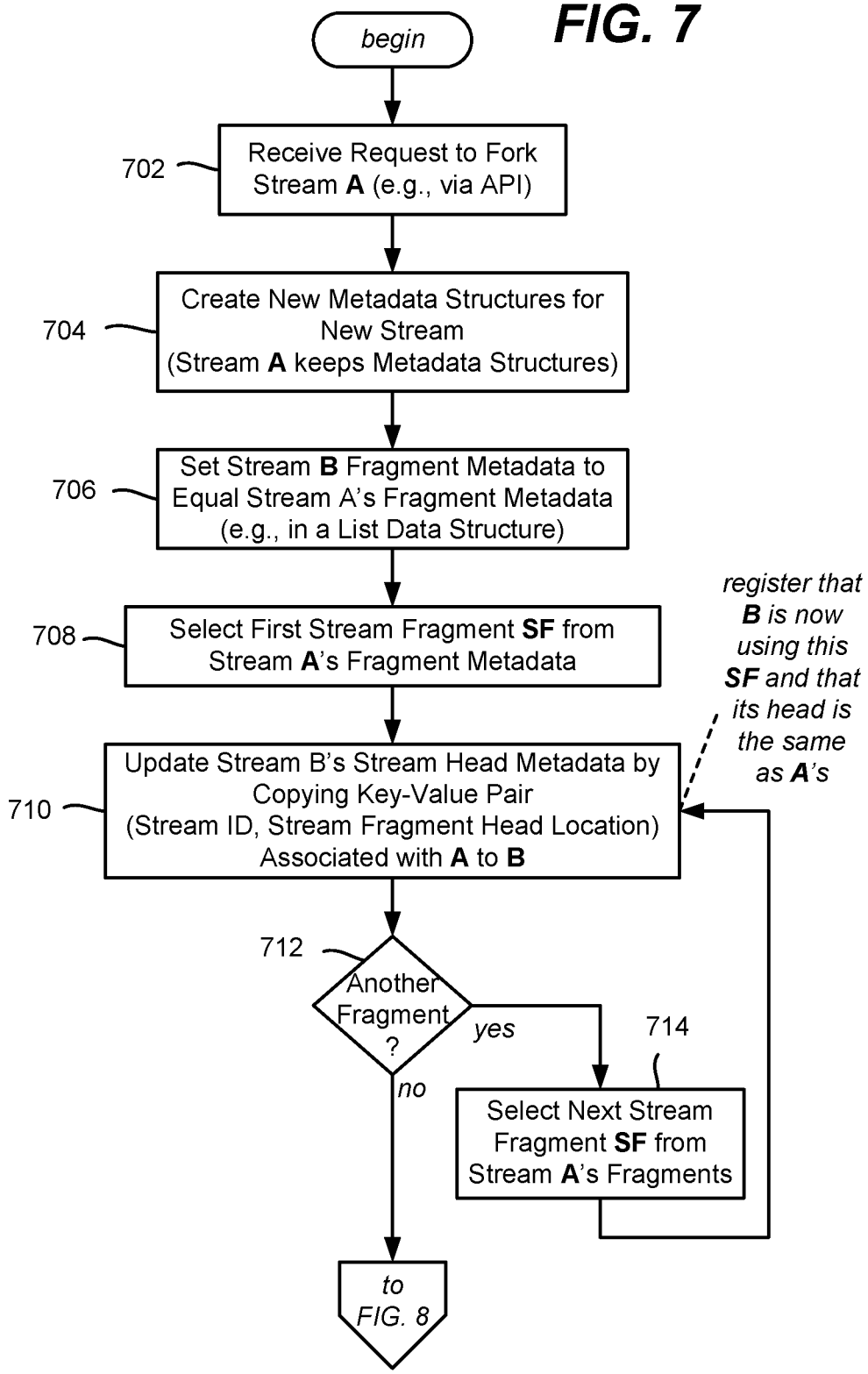
FIGS. 7 and 8 comprise a flow diagram showing example operations related to forking a stream, in accordance with various aspects and implementations of the subject disclosure.
Figure 8:
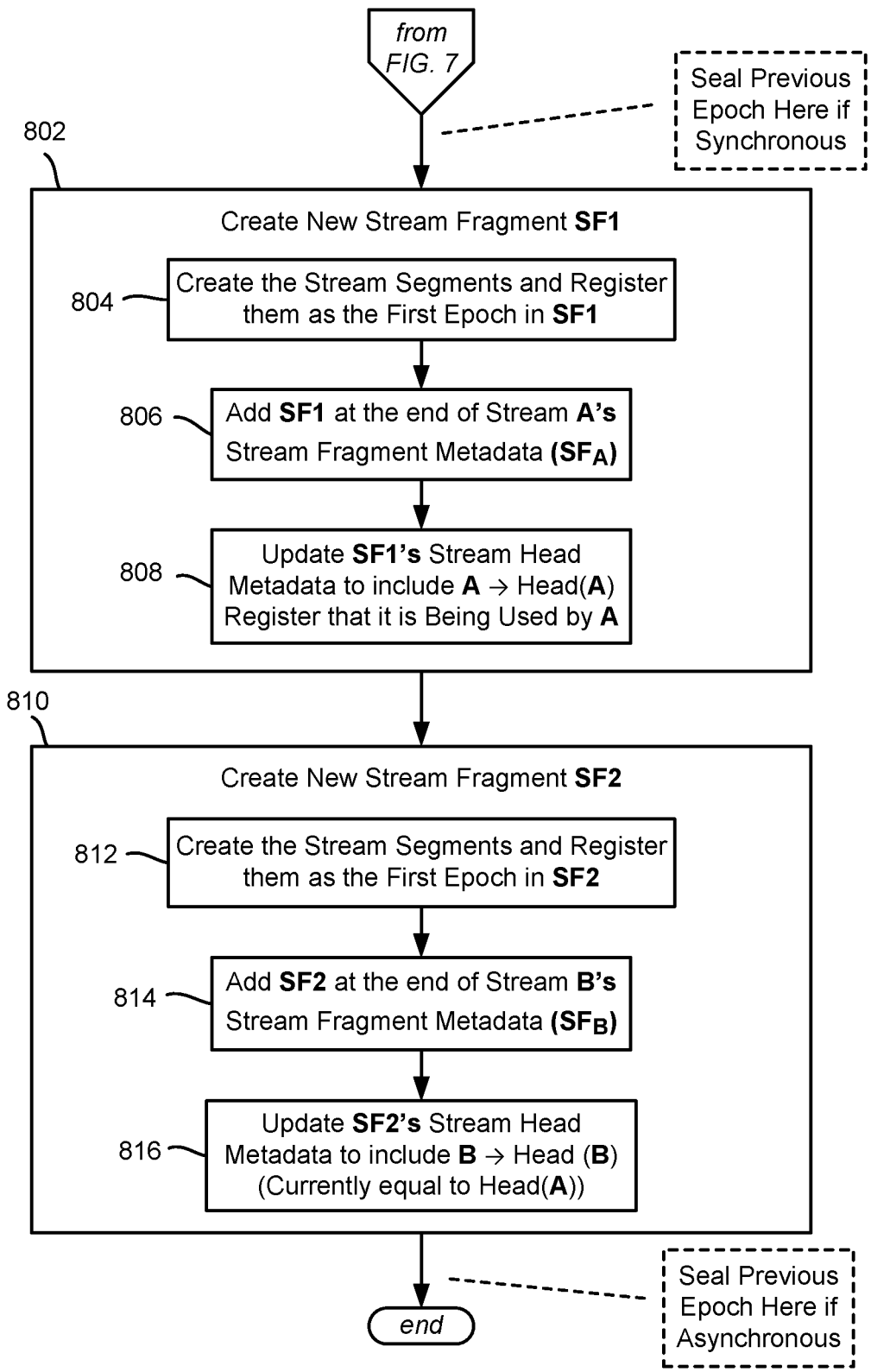

Turning to example fork-related operations, as represented in FIGS. 7 and 8, when a fork request is received at operation 702 of FIG. 7, the controller forks a stream A (made up of a set of one or more stream fragments SFA), which creates a stream B as described herein. To this end, operation 704 allocates new data structures for stream B, and at operation 706 stream B's stream fragment metadata is set to point to the stream fragment set SFA; (note that while the stream fragments are the same at this time, there are separate fragment data structures, such as lists, (one for A's stream fragment(s) and one for B's). There can be a single structure that contains the stream fragments for streams that share data via a fork as in block 550 of FIG. 5, or there can be a separate structure for each stream's set of stream fragments, as in the blocks 660(A) and 660(B) of FIG. 6. As is understood, there are many possible implementations for keeping these metadata.

For each stream fragment SF identified in the stream fragment set SFA, starting with the first stream fragment at operation 706, operation 708 updates the stream fragment's stream head metadata by copying the key-value pair associated with A to B; (this registers that B is now using this stream fragment set, and that its head is the same as A's head location). Operations 712 and 714 repeat operation 710 if there is more than one stream fragment in the set. For example, FIG. 5 shows in block 562 that streams A, B and C each (before any truncation) point to stream head H1.

The process continues to FIG. 8, operation 802 to create the new stream fragment SF1 for stream A. More particularly, operation 804 creates the corresponding stream segments (of the prior epoch) and registers them as the first epoch in SF1. Operation 806 adds SF1 to the end of the set (SFA) of stream A's fragments. Operation 808 updates SF1's stream head metadata to include that stream A points to Head (A), which registers that SF1 is being used by stream A.

Operations 810, 812, 814 and 816 repeat the creation process for stream B, namely creating stream fragment SF2, including the previous epoch's stream segments (operation 812) and at operation 814 adding new stream fragment SF2 to the end of B's fragment list (which because of FS2 is now distinct from A's list that includes SF1). Operation 816 similarly update stream fragment SF2's stream head metadata to include Head (B) (which is equal to Head (A) at the moment).

Note that as described herein, for synchronous forking, the previous epoch is sealed before creation the new stream fragment (operations 802-808). For asynchronous forking, the stream's prior epoch is not sealed until the new streams are ready to accept events, e.g., following operation 816. Note that if no writers are yet registered to B, the stream's prior epoch alternatively can be sealed following operation 808.

It should be noted that while forking of a stream into two streams has been described, it is feasible to fork a single stream into three or more streams at the same moment. For example, operations the operations of FIG. 7 related to a new stream can be performed per each forked stream, and the operations of FIG. 8 can be repeated for each forked stream.

Figure 9:
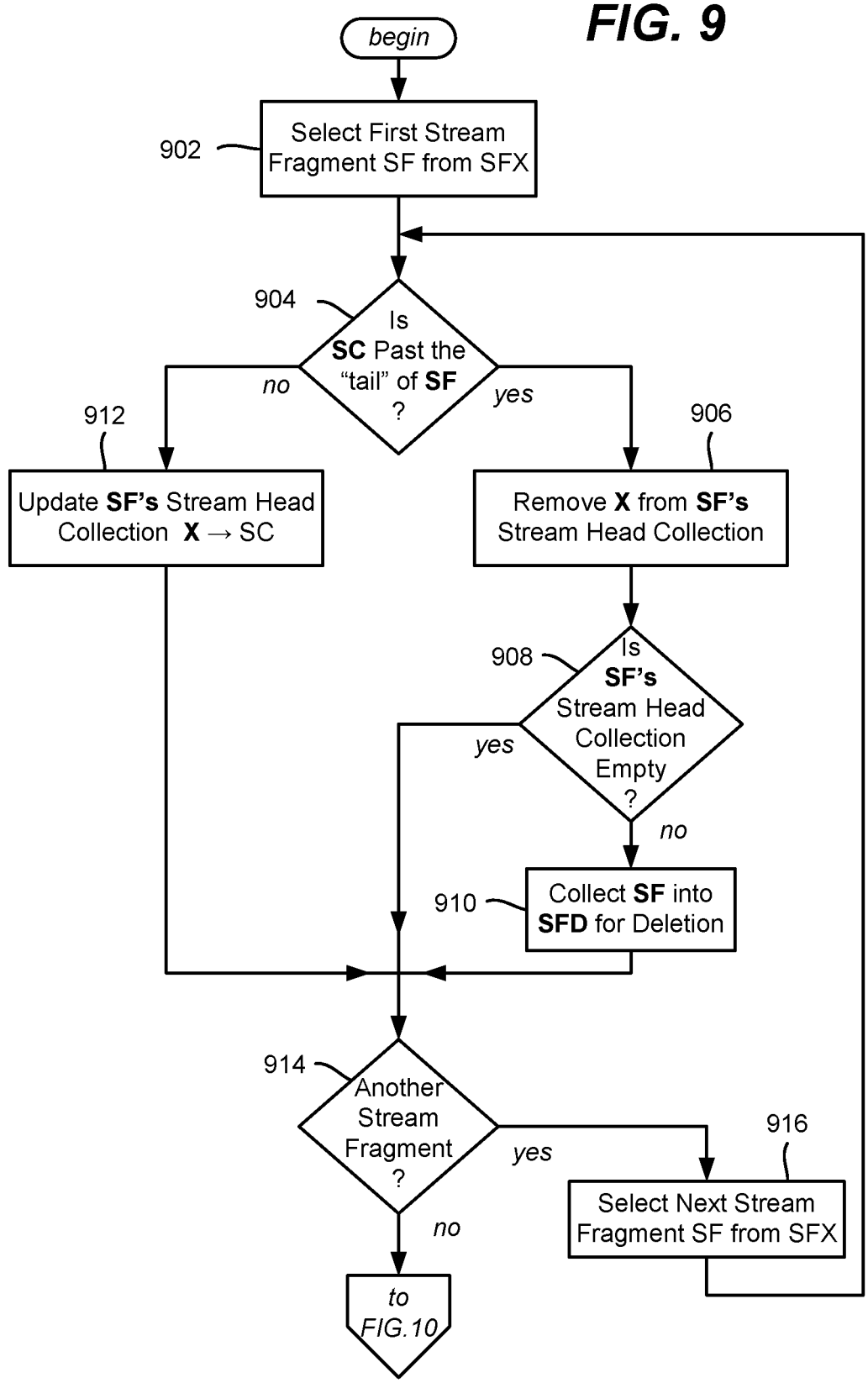
FIGS. 9 and 10 comprise a flow diagram showing example operations related to truncating a forked stream, in accordance with various aspects and implementations of the subject disclosure.
Figure 10:
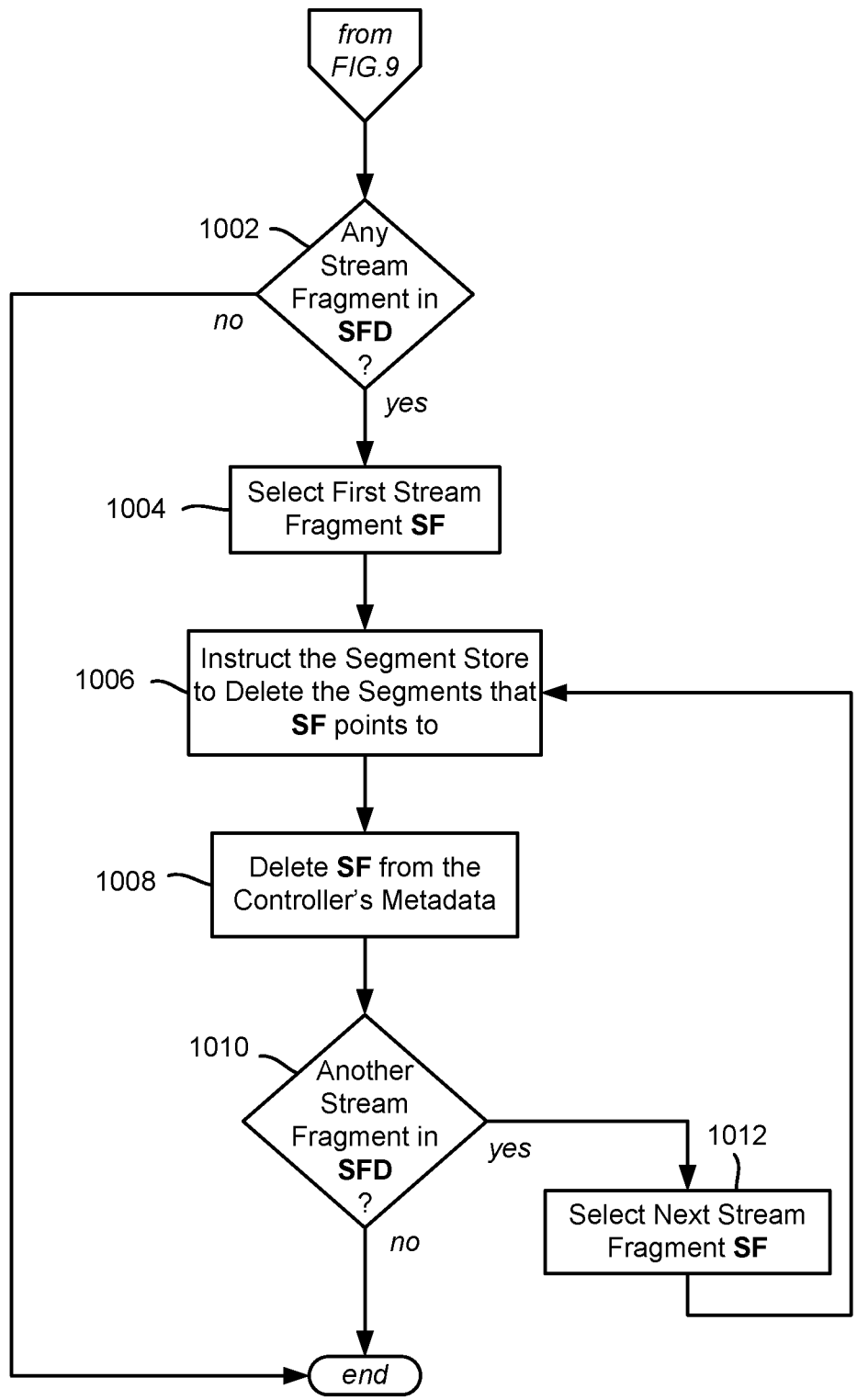

FIGS. 9 and 10 show example operations related to performing truncation on a stream cut SC, with respect to a stream X having a set of stream fragments SFX. Operation 902 selects the first stream fragment SF in SFX, and operation 904 evaluates whether the stream cut SC is beyond the end (basically like a "tail") of this stream fragment. If the stream cut SC is beyond the "tail" of SF, then operation 906 removes X from the stream fragment SF's stream head collection. If at operation 908 the stream head collection for the stream fragment SF is empty, operation 910 collects the stream fragment SF for deletion into a stream fragment deletion data structure, SFD.

Returning to operation 904, if the stream cut SC was not beyond the end of this stream fragment, operation 912 is performed to update SF's stream head collection with the stream cut for stream X, that is, for this stream fragment, the head metadata for stream X is moved up to point to the stream cut SC (X→SC).

Operations 914 and 916 repeat the above-described process for any other stream fragments in the set SFX, until none remain. The process then continues to FIG. 10.

Operation 1002 of FIG. 10 evaluates whether any stream fragment was accumulated in the stream fragment deletion data structure SFD; if not, the process ends. Otherwise, for each such stream fragment identified in SFD, that stream fragment is unreferenced by any stream, and thus is safe to delete.

Operation 1004 selects the first stream fragment SF in SFD, and operation instructs the segment store to delete the segments that first stream fragment SF points to. Operation 1008 deletes the first stream fragment SF from the controller's metadata. Operations 1010 and 1012 repeat the deletion of any additional stream fragments in SFD until none remain to be processed.

Note that stream fragments as described herein can work with hundreds and even thousands of segments between each stream fork. Updating each segment with references to each owning stream when forking or truncating is avoided via the technology described herein.

Further, stream fragments make "nested" forks straightforward to manage. Consider an example where stream A is forked into B, B is later forked into C, stream A into D, and so on. Stream fragments facilitate reasoning about such relationships and quickly identify which stream owns what; typically this would be impractical at the segment metadata level.

Figure 11:
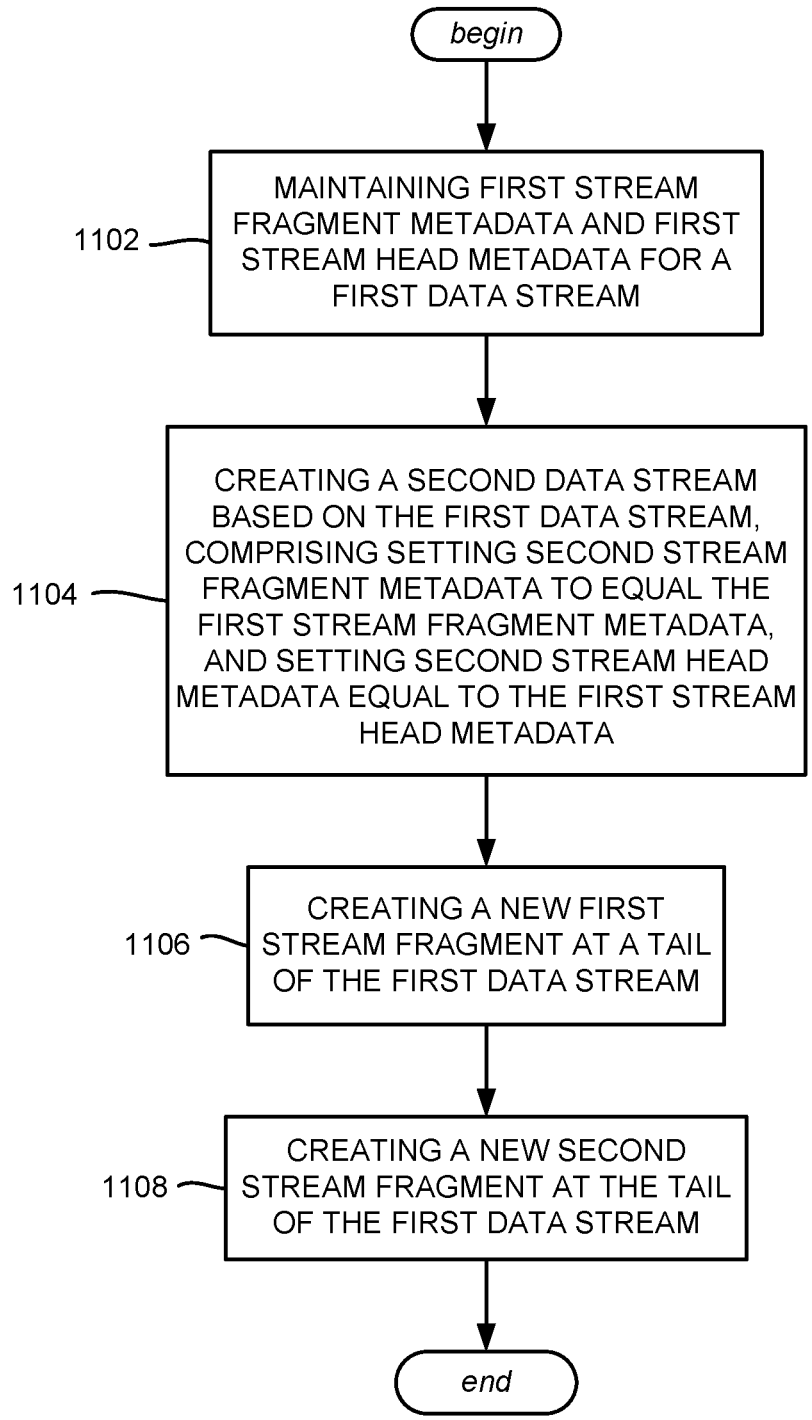
FIG. 11 is a flow diagram showing example operations related to creating a new first stream and a new second stream based on a first stream, in accordance with various aspects and implementations of the subject disclosure.

One or more aspects can be embodied in a system, such as represented in FIG. 11, and for example can comprise a memory that stores computer executable components and/or operations, and a processor that executes computer executable components and/or operations stored in the memory. Example operations can comprise operation 1102, which represents maintaining first stream fragment metadata and first stream head metadata for a first data stream. Operation 1104 represents creating a second data stream based on the first data stream, comprising setting second stream fragment metadata equal to the first stream fragment metadata data, and setting second stream head metadata equal to the first stream head metadata. Operation 1106 represents creating a new first stream fragment at a tail of the first data stream. Operation 1108 represents creating a new second stream fragment at the tail of the first data stream.

Further operations can comprise closing an epoch prior to creating the new first stream fragment.

Further operations can comprise closing an epoch after creating the new first stream fragment.

The first stream head metadata can comprise a first stream identifier and a pointer to a location in the first data stream. Further operations can comprise modifying the first stream head metadata of the first data stream in response to a truncation request; modifying the first stream head metadata can comprise moving the pointer to a more forward location in the first data stream. Further operations can comprise determining that no data stream created from the first data stream contains data prior to the more forward location, and in response to the determining, deleting the data of the first data stream that is prior to the more forward position.

Further operations can comprise registering a program to read from the second data stream.

Further operations can comprise appending events to the second stream fragment resulting in a new tail of the second data stream, creating a third data stream based on the second data stream, comprising setting third stream fragment metadata to equal the second stream fragment metadata, and setting third stream head metadata to equal the second stream head metadata, creating a new second stream fragment at the new tail of the second data stream, and creating a new third stream fragment at the new tail of the second data stream.

The first stream fragment metadata can comprise a series of stream fragments. The first stream fragment data to which a stream fragment corresponds can comprise a sequence of epochs.

Figure 12:
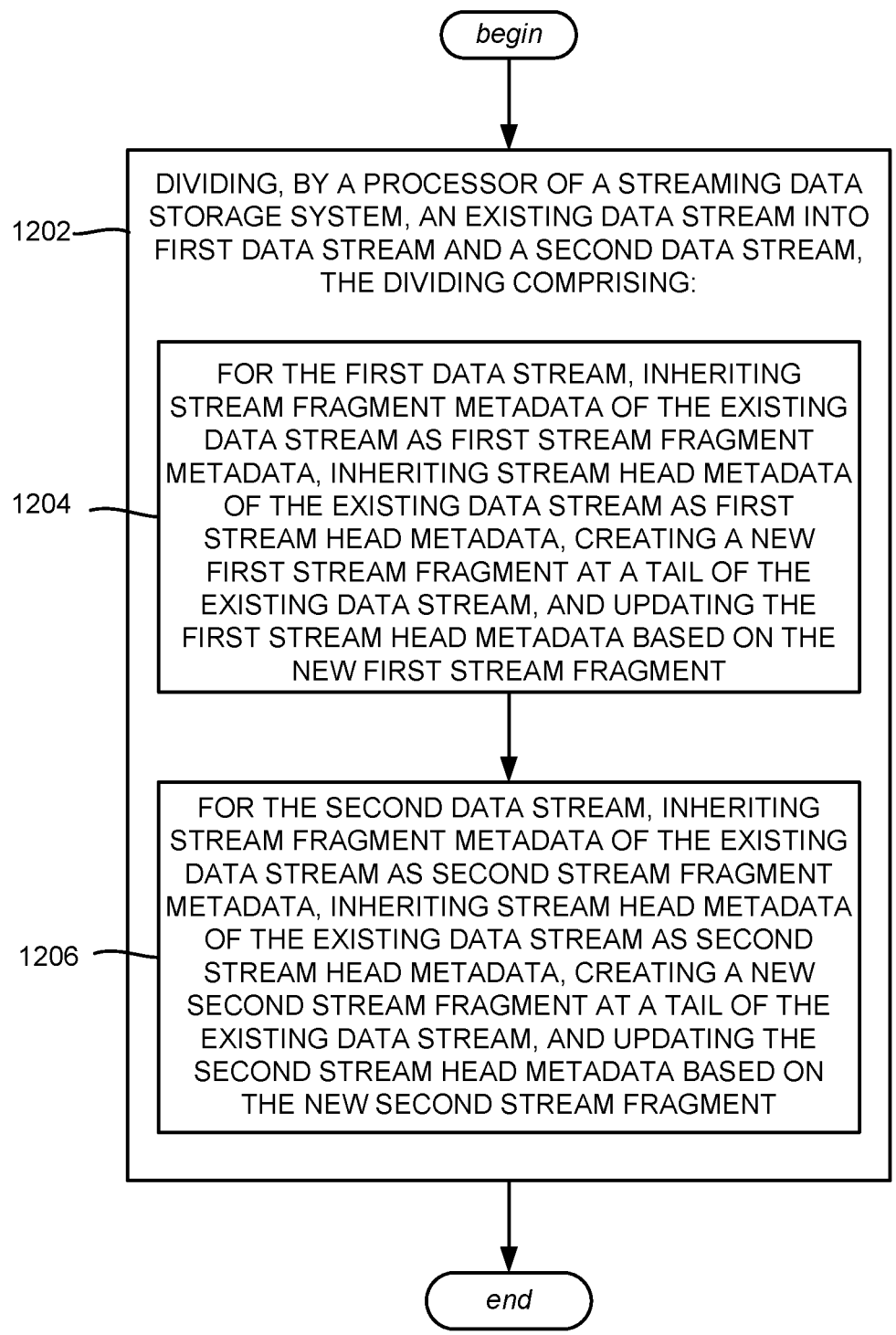
FIG. 12 is a flow diagram showing example operations related to dividing a stream into two related streams, in accordance with various aspects and implementations of the subject disclosure.

One or more example aspects, such as corresponding to example operations of a method, are represented in FIG. 12. Operation 1202 represents dividing, by a processor of a streaming data storage system, an existing data stream into first data stream and a second data stream. The dividing can comprise, for the first data stream, inheriting stream fragment metadata of the existing data stream as first stream fragment metadata, inheriting stream head metadata of the existing data stream as first stream head metadata, creating a new first stream fragment at a tail of the existing data stream, and updating the first stream head metadata based on the new first stream fragment (operation 1204), and for the second data stream, inheriting stream fragment metadata of the existing data stream as second stream fragment metadata, inheriting stream head metadata of the existing data stream as second stream head metadata, creating a new second stream fragment at a tail of the existing data stream, and updating the second stream head metadata based on the new second stream fragment (operation 1206).

Aspects can comprise inheriting, by the first data stream, an identifier of the existing data stream, and assigning, to the second data stream, a new identifier that is different from the identifier of the existing data stream.

Aspects can comprise inheriting, by the first data stream, one or more application programs registered to the existing data stream.

Aspects can comprise registering an application to the second data stream.

Aspects can comprise closing an epoch of the existing data stream prior to creating the new first stream fragment.

Aspects can comprise closing an epoch of the existing data stream after creating the new first stream fragment.

Aspects can comprise receiving a truncation request directed to truncating older data of the first data stream, and in response to the truncation request, moving a head location of the first data stream to a new head location further forward in the first data stream, and determining whether at least one data stream has any head location prior to the new head location, and, in response to determining that no data stream has any head location prior to the new head location, deleting the older data, and in response to determining that at least one data stream has at least one head location prior to the new head location, maintaining the older data for the at least one data stream.

Figure 13:
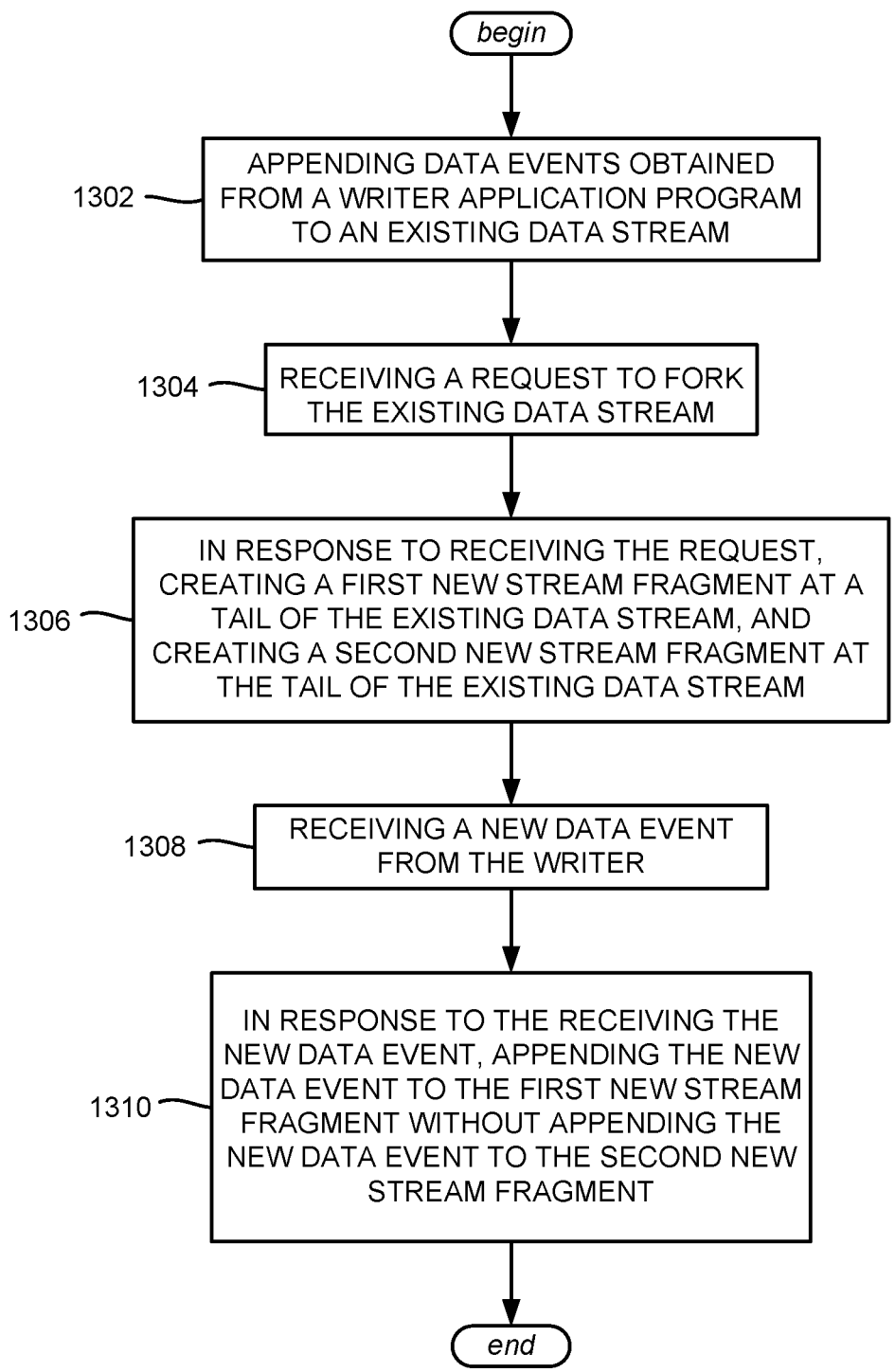
FIG. 13 is a flow diagram showing example operations related to handling events to be appended with respect to a forked data stream, in accordance with various aspects and implementations of the subject disclosure.

FIG. 13 summarizes various example operations, e.g., corresponding to a machine-readable storage medium, comprising executable instructions that, when executed by a processor of a streaming data storage system, facilitate performance of operations. Operation 1302 represents appending data events obtained from a writer application program to an existing data stream. Operation 1304 represents receiving a request to fork the existing data stream. Operation 1306 represents, in response to receiving the request, creating a first new stream fragment at a tail of the existing data stream, and creating a second new stream fragment at the tail of the existing data stream. Operation 1308 represents receiving a new data event from the writer. Operation 1310 represents, in response to the receiving the new data event, appending the new data event to the first new stream fragment without appending the new data event to the second new stream fragment.

The writer can be a first writer, the new data event can be a first data event, and further operations can comprise receiving, from a second writer, a second data event directed to the second new stream fragment, and in response to the receiving the second data event, appending the second data event to the second new stream fragment without appending the second data event to the first new stream fragment.

Further operations can comprise receiving a truncation request directed to truncating older data of the first data stream, and in response to receiving the truncation request, moving a head location of the first data stream to a new head location further forward in the first data stream, and determining whether at least one data stream has any head location prior to the new head location, in response to determining that no data stream has any head location prior to the new head location, deleting the older data, and in response to determining that at least one data stream has at least on head location prior to the new head location, maintaining the older data for the at least one data stream.

As can be seen, the technology described herein provides a practical way for forking data streams is practical to implement. The technology described herein facilitates virtually instant forking, with proper isolation of streams afterwards. The technology described herein facilitates straightforward usage, management and understanding of stream relationships, without requiring the applications to deal with stream management.

Figure 14:
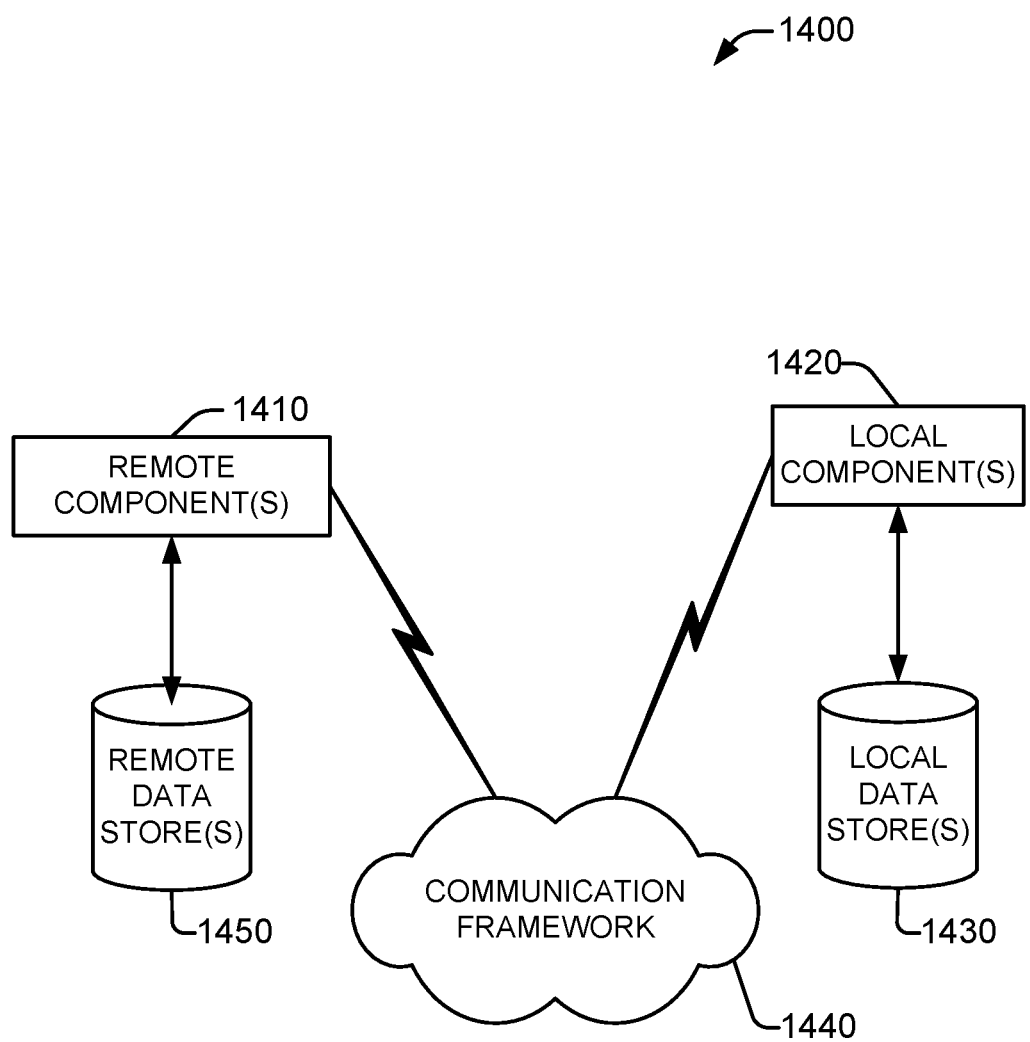
FIG. 14 is a block diagram representing an example computing environment into which aspects of the subject matter described herein may be incorporated.

FIG. 14 is a schematic block diagram of a computing environment 1400 with which the disclosed subject matter can interact. The system 1400 comprises one or more remote component(s) 1410. The remote component(s) 1410 can be hardware and/or software (e.g., threads, processes, computing devices). In some embodiments, remote component(s) 1410 can be a distributed computer system, connected to a local automatic scaling component and/or programs that use the resources of a distributed computer system, via communication framework 1440. Communication framework 1440 can comprise wired network devices, wireless network devices, mobile devices, wearable devices, radio access network devices, gateway devices, femtocell devices, servers, etc.

The system 1400 also comprises one or more local component(s) 1420. The local component(s) 1420 can be hardware and/or software (e.g., threads, processes, computing devices). In some embodiments, local component(s) 1420 can comprise an automatic scaling component and/or programs that communicate/use the remote resources 1410 and 1420, etc., connected to a remotely located distributed computing system via communication framework 1440.

One possible communication between a remote component(s) 1410 and a local component(s) 1420 can be in the form of a data packet adapted to be transmitted between two or more computer processes. Another possible communication between a remote component(s) 1410 and a local component(s) 1420 can be in the form of circuit-switched data adapted to be transmitted between two or more computer processes in radio time slots. The system 1400 comprises a communication framework 1440 that can be employed to facilitate communications between the remote component(s) 1410 and the local component(s) 1420, and can comprise an air interface, e.g., Uu interface of a UMTS network, via a long-term evolution (LTE) network, etc. Remote component(s) 1410 can be operably connected to one or more remote data store(s) 1450, such as a hard drive, solid state drive, SIM card, device memory, etc., that can be employed to store information on the remote component(s) 1410 side of communication framework 1440. Similarly, local component(s) 1420 can be operably connected to one or more local data store(s) 1430, that can be employed to store information on the local component(s) 1420 side of communication framework 1440.

Figure 15:
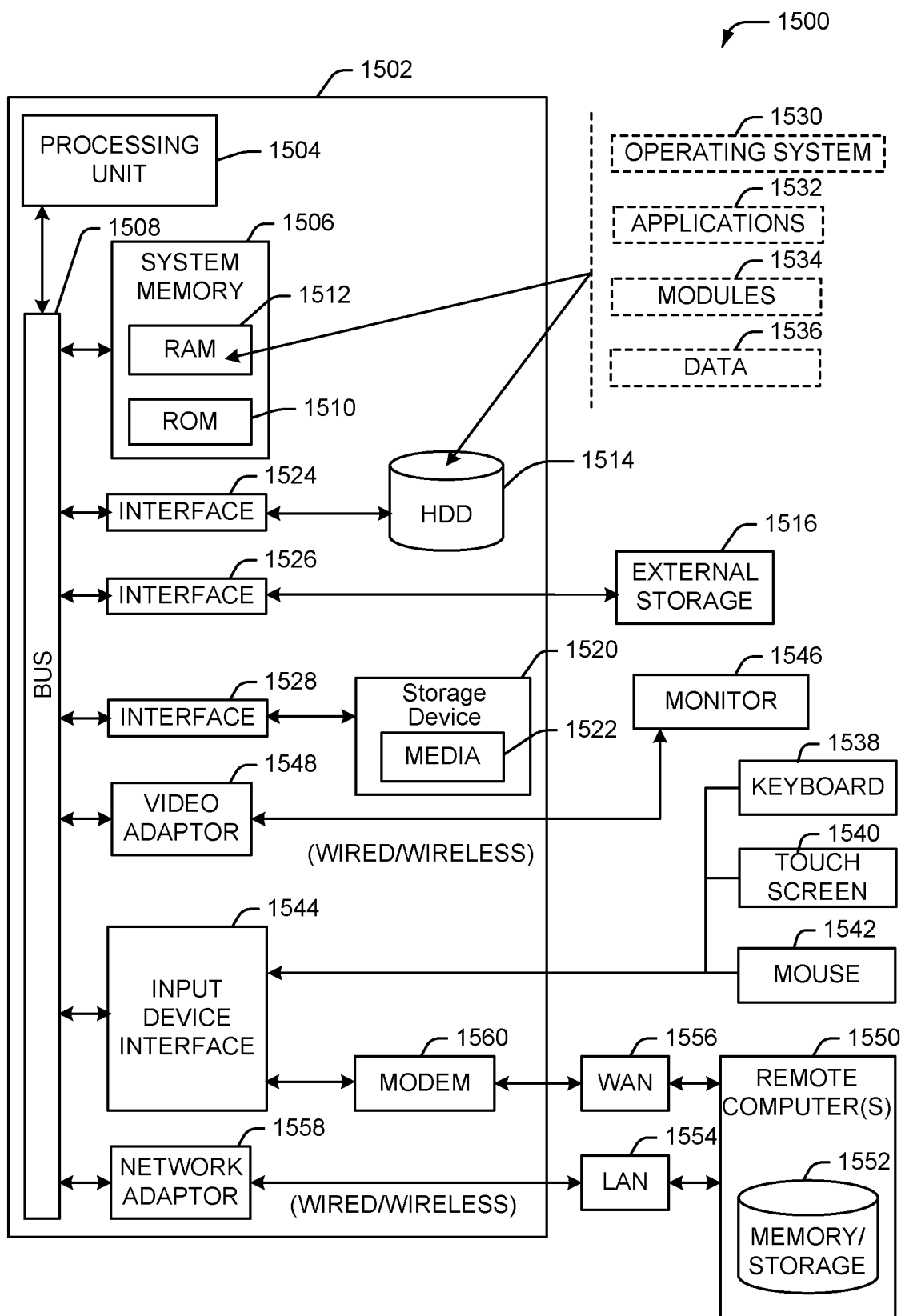
FIG. 15 depicts an example schematic block diagram of a computing environment with which the disclosed subject matter can interact/be implemented at least in part, in accordance with various aspects and implementations of the subject disclosure.

In order to provide additional context for various embodiments described herein, FIG. 15 and the following discussion are intended to provide a brief, general description of a suitable computing environment 1500 in which the various embodiments of the embodiment described herein can be implemented. While the embodiments have been described above in the general context of computer-executable instructions that can run on one or more computers, those skilled in the art will recognize that the embodiments can be also implemented in combination with other program modules and/or as a combination of hardware and software.

Generally, program modules include routines, programs, components, data structures, etc., that perform particular tasks or implement particular abstract data types. Moreover, those skilled in the art will appreciate that the methods can be practiced with other computer system configurations, including single-processor or multiprocessor computer systems, minicomputers, mainframe computers, Internet of Things (IoT) devices, distributed computing systems, as well as personal computers, hand-held computing devices, microprocessor-based or programmable consumer electronics, and the like, each of which can be operatively coupled to one or more associated devices.

The illustrated embodiments of the embodiments herein can be also practiced in distributed computing environments where certain tasks are performed by remote processing devices that are linked through a communications network. In a distributed computing environment, program modules can be located in both local and remote memory storage devices.

Computing devices typically include a variety of media, which can include computer-readable storage media, machine-readable storage media, and/or communications media, which two terms are used herein differently from one another as follows. Computer-readable storage media or machine-readable storage media can be any available storage media that can be accessed by the computer and includes both volatile and nonvolatile media, removable and non-removable media. By way of example, and not limitation, computer-readable storage media or machine-readable storage media can be implemented in connection with any method or technology for storage of information such as computer-readable or machine-readable instructions, program modules, structured data or unstructured data.

Computer-readable storage media can include, but are not limited to, random access memory (RAM), read only memory (ROM), electrically erasable programmable read only memory (EEPROM), flash memory or other memory technology, compact disk read only memory (CD-ROM), digital versatile disk (DVD), Blu-ray disc (BD) or other optical disk storage, magnetic cassettes, magnetic tape, magnetic disk storage or other magnetic storage devices, solid state drives or other solid state storage devices, or other tangible and/or non-transitory media which can be used to store desired information. In this regard, the terms "tangible" or "non-transitory" herein as applied to storage, memory or computer-readable media, are to be understood to exclude only propagating transitory signals per se as modifiers and do not relinquish rights to all standard storage, memory or computer-readable media that are not only propagating transitory signals per se.

Computer-readable storage media can be accessed by one or more local or remote computing devices, e.g., via access requests, queries or other data retrieval protocols, for a variety of operations with respect to the information stored by the medium.

Communications media typically embody computer-readable instructions, data structures, program modules or other structured or unstructured data in a data signal such as a modulated data signal, e.g., a carrier wave or other transport mechanism, and includes any information delivery or transport media. The term "modulated data signal" or signals refers to a signal that has one or more of its characteristics set or changed in such a manner as to encode information in one or more signals. By way of example, and not limitation, communication media include wired media, such as a wired network or direct-wired connection, and wireless media such as acoustic, RF, infrared and other wireless media.

With reference again to FIG. 15, the example environment 1500 for implementing various embodiments of the aspects described herein includes a computer 1502, the computer 1502 including a processing unit 1504, a system memory 1506 and a system bus 1508. The system bus 1508 couples system components including, but not limited to, the system memory 1506 to the processing unit 1504. The processing unit 1504 can be any of various commercially available processors. Dual microprocessors and other multi-processor architectures can also be employed as the processing unit 1504.

The system bus 1508 can be any of several types of bus structure that can further interconnect to a memory bus (with or without a memory controller), a peripheral bus, and a local bus using any of a variety of commercially available bus architectures. The system memory 1506 includes ROM 1510 and RAM 1512. A basic input/output system (BIOS) can be stored in a non-volatile memory such as ROM, erasable programmable read only memory (EPROM), EEPROM, which BIOS contains the basic routines that help to transfer information between elements within the computer 1502, such as during startup. The RAM 1512 can also include a high-speed RAM such as static RAM for caching data.

The computer 1502 further includes an internal hard disk drive (HDD) 1514 (e.g., EIDE, SATA), and can include one or more external storage devices 1516 (e.g., a magnetic floppy disk drive (FDD) 1516, a memory stick or flash drive reader, a memory card reader, etc.). While the internal HDD 1514 is illustrated as located within the computer 1502, the internal HDD 1514 can also be configured for external use in a suitable chassis (not shown). Additionally, while not shown in environment 1500, a solid state drive (SSD) could be used in addition to, or in place of, an HDD 1514.

Other internal or external storage can include at least one other storage device 1520 with storage media 1522 (e.g., a solid state storage device, a nonvolatile memory device, and/or an optical disk drive that can read or write from removable media such as a CD-ROM disc, a DVD, a BD, etc.). The external storage 1516 can be facilitated by a network virtual machine. The HDD 1514, external storage device(s) 1516 and storage device (e.g., drive) 1520 can be connected to the system bus 1508 by an HDD interface 1524, an external storage interface 1526 and a drive interface 1528, respectively.

The drives and their associated computer-readable storage media provide nonvolatile storage of data, data structures, computer-executable instructions, and so forth. For the computer 1502, the drives and storage media accommodate the storage of any data in a suitable digital format. Although the description of computer-readable storage media above refers to respective types of storage devices, it should be appreciated by those skilled in the art that other types of storage media which are readable by a computer, whether presently existing or developed in the future, could also be used in the example operating environment, and further, that any such storage media can contain computer-executable instructions for performing the methods described herein.

A number of program modules can be stored in the drives and RAM 1512, including an operating system 1530, one or more application programs 1532, other program modules 1534 and program data 1536. All or portions of the operating system, applications, modules, and/or data can also be cached in the RAM 1512. The systems and methods described herein can be implemented utilizing various commercially available operating systems or combinations of operating systems.

Computer 1502 can optionally comprise emulation technologies. For example, a hypervisor (not shown) or other intermediary can emulate a hardware environment for operating system 1530, and the emulated hardware can optionally be different from the hardware illustrated in FIG. 15. In such an embodiment, operating system 1530 can comprise one virtual machine (VM) of multiple VMs hosted at computer 1502. Furthermore, operating system 1530 can provide runtime environments, such as the Java runtime environment or the .NET framework, for applications 1532. Runtime environments are consistent execution environments that allow applications 1532 to run on any operating system that includes the runtime environment. Similarly, operating system 1530 can support containers, and applications 1532 can be in the form of containers, which are lightweight, standalone, executable packages of software that include, e.g., code, runtime, system tools, system libraries and settings for an application.

Further, computer 1502 can be enabled with a security module, such as a trusted processing module (TPM). For instance with a TPM, boot components hash next in time boot components, and wait for a match of results to secured values, before loading a next boot component. This process can take place at any layer in the code execution stack of computer 1502, e.g., applied at the application execution level or at the operating system (OS) kernel level, thereby enabling security at any level of code execution.

A user can enter commands and information into the computer 1502 through one or more wired/wireless input devices, e.g., a keyboard 1538, a touch screen 1540, and a pointing device, such as a mouse 1542. Other input devices (not shown) can include a microphone, an infrared (IR) remote control, a radio frequency (RF) remote control, or other remote control, a joystick, a virtual reality controller and/or virtual reality headset, a game pad, a stylus pen, an image input device, e.g., camera(s), a gesture sensor input device, a vision movement sensor input device, an emotion or facial detection device, a biometric input device, e.g., fingerprint or iris scanner, or the like. These and other input devices are often connected to the processing unit 1504 through an input device interface 1544 that can be coupled to the system bus 1508, but can be connected by other interfaces, such as a parallel port, an IEEE 1494 serial port, a game port, a USB port, an IR interface, a BLUETOOTH® interface, etc.

A monitor 1546 or other type of display device can be also connected to the system bus 1508 via an interface, such as a video adapter 1548. In addition to the monitor 1546, a computer typically includes other peripheral output devices (not shown), such as speakers, printers, etc.

The computer 1502 can operate in a networked environment using logical connections via wired and/or wireless communications to one or more remote computers, such as a remote computer(s) 1550. The remote computer(s) 1550 can be a workstation, a server computer, a router, a personal computer, portable computer, microprocessor-based entertainment appliance, a peer device or other common network node, and typically includes many or all of the elements described relative to the computer 1502, although, for purposes of brevity, only a memory/storage device 1552 is illustrated. The logical connections depicted include wired/wireless connectivity to a local area network (LAN) 1554 and/or larger networks, e.g., a wide area network (WAN) 1556. Such LAN and WAN networking environments are commonplace in offices and companies, and facilitate enterprise-wide computer networks, such as intranets, all of which can connect to a global communications network, e.g., the Internet.

When used in a LAN networking environment, the computer 1502 can be connected to the local network 1554 through a wired and/or wireless communication network interface or adapter 1558. The adapter 1558 can facilitate wired or wireless communication to the LAN 1554, which can also include a wireless access point (AP) disposed thereon for communicating with the adapter 1558 in a wireless mode.

When used in a WAN networking environment, the computer 1502 can include a modem 1560 or can be connected to a communications server on the WAN 1556 via other means for establishing communications over the WAN 1556, such as by way of the Internet. The modem 1560, which can be internal or external and a wired or wireless device, can be connected to the system bus 1508 via the input device interface 1544. In a networked environment, program modules depicted relative to the computer 1502 or portions thereof, can be stored in the remote memory/storage device 1552. It will be appreciated that the network connections shown are example and other means of establishing a communications link between the computers can be used.

When used in either a LAN or WAN networking environment, the computer 1502 can access cloud storage systems or other network-based storage systems in addition to, or in place of, external storage devices 1516 as described above. Generally, a connection between the computer 1502 and a cloud storage system can be established over a LAN 1554 or WAN 1556 e.g., by the adapter 1558 or modem 1560, respectively. Upon connecting the computer 1502 to an associated cloud storage system, the external storage interface 1526 can, with the aid of the adapter 1558 and/or modem 1560, manage storage provided by the cloud storage system as it would other types of external storage. For instance, the external storage interface 1526 can be configured to provide access to cloud storage sources as if those sources were physically connected to the computer 1502.

The computer 1502 can be operable to communicate with any wireless devices or entities operatively disposed in wireless communication, e.g., a printer, scanner, desktop and/or portable computer, portable data assistant, communications satellite, any piece of equipment or location associated with a wirelessly detectable tag (e.g., a kiosk, news stand, store shelf, etc.), and telephone. This can include Wireless Fidelity (Wi-Fi) and BLUETOOTH® wireless technologies. Thus, the communication can be a predefined structure as with a conventional network or simply an ad hoc communication between at least two devices.

The above description of illustrated embodiments of the subject disclosure, comprising what is described in the Abstract, is not intended to be exhaustive or to limit the disclosed embodiments to the precise forms disclosed. While specific embodiments and examples are described herein for illustrative purposes, various modifications are possible that are considered within the scope of such embodiments and examples, as those skilled in the relevant art can recognize.

In this regard, while the disclosed subject matter has been described in connection with various embodiments and corresponding Figures, where applicable, it is to be understood that other similar embodiments can be used or modifications and additions can be made to the described embodiments for performing the same, similar, alternative, or substitute function of the disclosed subject matter without deviating therefrom. Therefore, the disclosed subject matter should not be limited to any single embodiment described herein, but rather should be construed in breadth and scope in accordance with the appended claims below.

As it employed in the subject specification, the term "processor" can refer to substantially any computing processing unit or device comprising, but not limited to comprising, single-core processors; single-processors with software multithread execution capability; multi-core processors; multi-core processors with software multithread execution capability; multi-core processors with hardware multithread technology; parallel platforms; and parallel platforms with distributed shared memory. Additionally, a processor can refer to an integrated circuit, an application specific integrated circuit, a digital signal processor, a field programmable gate array, a programmable logic controller, a complex programmable logic device, a discrete gate or transistor logic, discrete hardware components, or any combination thereof designed to perform the functions described herein. Processors can exploit nano-scale architectures such as, but not limited to, molecular and quantum-dot based transistors, switches and gates, in order to optimize space usage or enhance performance of user equipment. A processor may also be implemented as a combination of computing processing units.

As used in this application, the terms "component," "system," "platform," "layer," "selector," "interface," and the like are intended to refer to a computer-related entity or an entity related to an operational apparatus with one or more specific functionalities, wherein the entity can be either hardware, a combination of hardware and software, software, or software in execution. As an example, a component may be, but is not limited to being, a process running on a processor, a processor, an object, an executable, a thread of execution, a program, and/or a computer. By way of illustration and not limitation, both an application running on a server and the server can be a component. One or more components may reside within a process and/or thread of execution and a component may be localized on one computer and/or distributed between two or more computers. In addition, these components can execute from various computer readable media having various data structures stored thereon. The components may communicate via local and/or remote processes such as in accordance with a signal having one or more data packets (e.g., data from one component interacting with another component in a local system, distributed system, and/or across a network such as the Internet with other systems via the signal). As another example, a component can be an apparatus with specific functionality provided by mechanical parts operated by electric or electronic circuitry, which is operated by a software or a firmware application executed by a processor, wherein the processor can be internal or external to the apparatus and executes at least a part of the software or firmware application. As yet another example, a component can be an apparatus that provides specific functionality through electronic components without mechanical parts, the electronic components can comprise a processor therein to execute software or firmware that confers at least in part the functionality of the electronic components.

In addition, the term "or" is intended to mean an inclusive "or" rather than an exclusive "or." That is, unless specified otherwise, or clear from context, "X employs A or B" is intended to mean any of the natural inclusive permutations. That is, if X employs A; X employs B; or X employs both A and B, then "X employs A or B" is satisfied under any of the foregoing instances.

While the embodiments are susceptible to various modifications and alternative constructions, certain illustrated implementations thereof are shown in the drawings and have been described above in detail. It should be understood, however, that there is no intention to limit the various embodiments to the specific forms disclosed, but on the contrary, the intention is to cover all modifications, alternative constructions, and equivalents falling within the spirit and scope.

In addition to the various implementations described herein, it is to be understood that other similar implementations can be used or modifications and additions can be made to the described implementation(s) for performing the same or equivalent function of the corresponding implementation(s) without deviating therefrom. Still further, multiple processing chips or multiple devices can share the performance of one or more functions described herein, and similarly, storage can be effected across a plurality of devices. Accordingly, the various embodiments are not to be limited to any single implementation, but rather are to be construed in breadth, spirit and scope in accordance with the appended claims.

What is claimed is:

1. A system, comprising:
a processor; and
a memory that stores executable instructions that, when executed by the processor, facilitate performance of operations, the operations comprising:
maintaining first stream fragment metadata and first stream head metadata for a first data stream;
creating a second data stream based on the first data stream, comprising setting second stream fragment metadata equal to the first stream fragment metadata, and setting second stream head metadata equal to the first stream head metadata;
creating a new first stream fragment at a tail of the first data stream; and
creating a new second stream fragment at the tail of the first data stream.

2. The system of claim 1, wherein the operations further comprise closing an epoch prior to creating the new first stream fragment.

3. The system of claim 1, wherein the operations further comprise closing an epoch after creating the new first stream fragment.

4. The system of claim 1, wherein the first stream head metadata comprises a first stream identifier and a pointer to a location in the first data stream.

5. The system of claim 4, wherein the operations further comprise modifying the first stream head metadata of the first data stream in response to a truncation request, the modifying the first stream head metadata comprising moving the pointer to a more forward location in the first data stream.

6. The system of claim 5, wherein the operations further comprise determining that no data stream created from the first data stream contains data prior to the more forward location, and in response to the determining, deleting the data of the first data stream that is prior to the more forward position.

7. The system of claim 1, wherein the operations further comprise registering a program to read from the second data stream.

8. The system of claim 1, wherein the operations further comprise,
appending events to the second stream fragment resulting in a new tail of the second data stream,
creating a third data stream based on the second data stream, comprising setting third stream fragment metadata to equal the second stream fragment metadata, and setting third stream head metadata to equal the second stream head metadata,
creating a new second stream fragment at the new tail of the second data stream, and
creating a new third stream fragment at the new tail of the second data stream.

9. The system of claim 1, wherein the first stream fragment metadata comprises a series of stream fragments.

10. The system of claim 1, wherein the first stream fragment data to which a stream fragment corresponds comprises a sequence of epochs.

11. A method, comprising:
dividing, by a processor of a streaming data storage system, an existing data stream into first data stream and a second data stream, the dividing comprising:
for the first data stream, inheriting stream fragment metadata of the existing data stream as first stream fragment metadata, inheriting stream head metadata of the existing data stream as first stream head metadata, creating a new first stream fragment at a tail of the existing data stream, and updating the first stream head metadata based on the new first stream fragment; and
for the second data stream, inheriting stream fragment metadata of the existing data stream as second stream fragment metadata, inheriting stream head metadata of the existing data stream as second stream head metadata, creating a new second stream fragment at a tail of the existing data stream, and updating the second stream head metadata based on the new second stream fragment.

12. The method of claim 11, further comprising inheriting, by the first data stream, an identifier of the existing data stream, and assigning, to the second data stream, a new identifier that is different from the identifier of the existing data stream.

13. The method of claim 11, further comprising inheriting, by the first data stream, one or more application programs registered to the existing data stream.

14. The method of claim 11, further comprising registering an application to the second data stream.

15. The method of claim 11, further comprising closing an epoch of the existing data stream prior to creating the new first stream fragment.

16. The method of claim 11, further comprising closing an epoch of the existing data stream after creating the new first stream fragment.

17. The method of claim 11, further comprising receiving a truncation request directed to truncating older data of the first data stream, and in response to the truncation request, moving a head location of the first data stream to a new head location further forward in the first data stream, and determining whether at least one data stream has any head location prior to the new head location, and
 in response to determining that no data stream has any head location prior to the new head location, deleting the older data, and
 in response to determining that at least one data stream has at least one head location prior to the new head location, maintaining the older data for the at least one data stream.

18. A non-transitory machine-readable medium, comprising executable instructions that, when executed by a processor of a streaming data storage system, facilitate performance of operations, the operations comprising:
 appending data events obtained from a writer application program to an existing data stream;
 receiving a request to fork the existing data stream;
 in response to receiving the request, creating a first new stream fragment at a tail of the existing data stream, and creating a second new stream fragment at the tail of the existing data stream;
 receiving a new data event from the writer; and
 in response to the receiving the new data event, appending the new data event to the first new stream fragment without appending the new data event to the second new stream fragment.

19. The non-transitory machine-readable medium of claim 18, wherein the writer is a first writer, wherein the new data event is a first data event, and wherein the operations further comprise receiving, from a second writer, a second data event directed to the second new stream fragment, and in response to the receiving the second data event, appending the second data event to the second new stream fragment without appending the second data event to the first new stream fragment.

20. The non-transitory machine-readable medium of claim 18, wherein the operations further comprise,
 receiving a truncation request directed to truncating older data of the first data stream,
 in response to receiving the truncation request, moving a head location of the first data stream to a new head location further forward in the first data stream, and determining whether at least one data stream has any head location prior to the new head location,
 in response to determining that no data stream has any head location prior to the new head location, deleting the older data, and
 in response to determining that at least one data stream has at least one head location prior to the new head location, maintaining the older data for the at least one data stream.

* * * * *